United States Patent
Nishimoto (10) Patent No.: US 7,058,432 B2
(45) Date of Patent: Jun. 6, 2006

(54) POINTING DEVICE AND MOBILE TELEPHONE

(75) Inventor: Hajime Nishimoto, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 385 days.

(21) Appl. No.: 09/960,939

(22) Filed: Sep. 25, 2001

(65) Prior Publication Data

US 2002/0155857 A1    Oct. 24, 2002

(30) Foreign Application Priority Data

Apr. 20, 2001    (JP)    ............................. 2001-122622

(51) Int. Cl.
*H04Q 7/20*    (2006.01)

(52) U.S. Cl. ............................... 455/575.1; 455/151.2; 455/566

(58) Field of Classification Search ............ 455/456.6, 455/550.1, 566, 575.1, FOR. 246, 566.1, 455/151.2, 152.1; 345/156–157, 163–164, 345/166–168, 173–175, 841; 713/321; 372/39, 372/43, 45, 46; 359/244, 19, 201, 252, 226; 385/89; 600/168; 257/13, 79, 82
See application file for complete search history.

(56) References Cited

U.S. PATENT DOCUMENTS

| | | | | |
|---|---|---|---|---|
| 5,396,443 | A * | 3/1995 | Mese et al. .................. | 713/321 |
| 5,532,753 | A * | 7/1996 | Buchner et al. .............. | 725/56 |
| 6,552,713 | B1 * | 4/2003 | Van Brocklin et al. ..... | 345/157 |
| 6,593,949 | B1 * | 7/2003 | Chew et al. ................. | 345/841 |
| 6,677,929 | B1 * | 1/2004 | Gordon et al. .............. | 345/156 |
| 6,781,570 | B1 * | 8/2004 | Arrigo et al. ................ | 345/158 |
| 2002/0052209 | A1 * | 5/2002 | Frohlund ..................... | 455/456 |
| 2002/0130835 | A1 * | 9/2002 | Brosnan ...................... | 345/156 |

FOREIGN PATENT DOCUMENTS

| | | |
|---|---|---|
| JP | 8-249122 | 9/1996 |
| JP | 11-32113 | 2/1999 |
| JP | 11-53102 | 2/1999 |
| JP | 11-341114 | 12/1999 |
| JP | 2000-163212 | 6/2000 |
| JP | 2002-62983 | 2/2002 |
| JP | 2002-351608 | 12/2002 |

OTHER PUBLICATIONS

"Solid-State Optical Mouse Sensor with PS/2 and Quadrature Outputs", Application Note 1179 Agilent Technologies Inc., 2000, pp. 1-12.

"Agilent HDNS-2000 Optical Mouse Sensor" Agilent Technologies, Inc., Jan. 4, 2001 (2 pages).

* cited by examiner

*Primary Examiner*—Jean Gelin
(74) *Attorney, Agent, or Firm*—Oblon, Spivak, McClelland, Maier & Neustadt, P.C.

(57) ABSTRACT

In a small-size mobile terminal, an optical sensor for reading an optical image of a finger that is kept in contact therewith is installed below an LCD for displaying information. The optical sensor is provided with a light source for emitting a predetermined light beam toward a sensor window, a lens for converging light reflected by the finger that is in contact with the sensor window and an image sensor for detecting the converged light. A CPU shifts a pointer based upon the movement of the finger detected by the optical sensor. Thus, it is possible to obtain a pointing device that is superior in the operability, miniaturizes the device, and is resistive to dusts.

7 Claims, 12 Drawing Sheets

POINTING DEVICE AND MOBILE TELEPHONE

BACKGROUND OF THE INVENTION

1. Field of the Invention

The present invention relates to a pointing device and a mobile telephone, and more particularly, concerns a pointing device that is superior in operability for use with a fingertip and a mobile telephone using such a device.

2. Description of the Background Art

Figure 20:
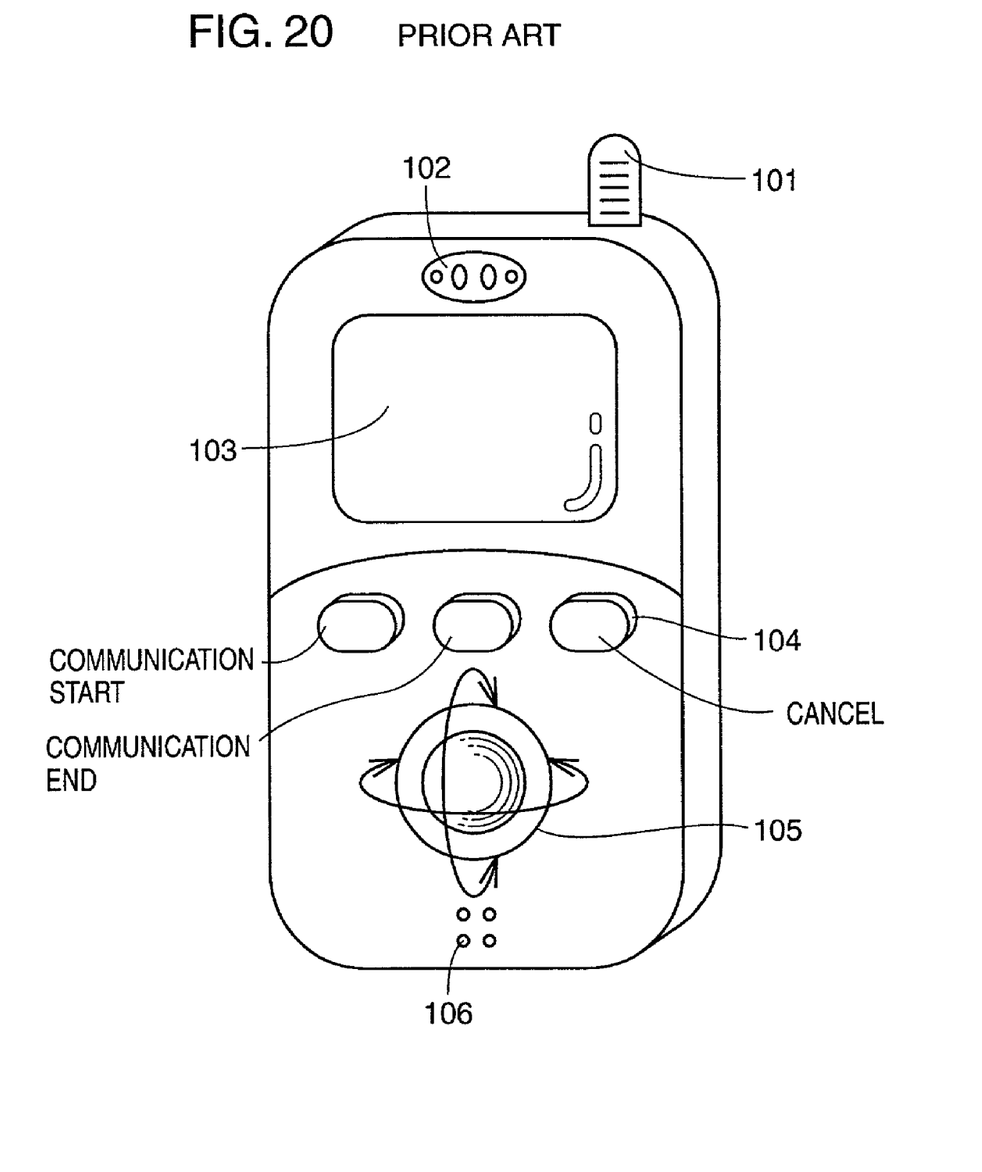
FIG. 20 is a perspective view of a conventional mobile telephone.

An explanation will be given of a mobile telephone disclosed in Japanese Patent Laying-Open No. 11-32113 as one example of conventional mobile telephones. Referring to FIG. 20, a speaker 102, an LCD (Liquid Crystal Display) 103, a specific function key 104, a track ball 105 and a microphone 106 are placed on the front face of the mobile telephone. Moreover, an antenna 101 is attached to an upper portion of the mobile telephone.

In particular, track ball 105 is rotatable in longitudinal and lateral four directions. A plurality of menus are displayed on LCD 103. A desired menu is selected from the plurality of menus by properly rotating track ball 105 in the four directions to set a pointer to the corresponding menu and pushing another selection key (not shown). Thus, the operation corresponding to the menu is carried out.

However, the above-mentioned mobile telephone has the following problems. It is easy to rotate track ball 105 in the four directions so as to freely set the pointer to any one of the menus displayed on LCD 103; however, in order to select the menu to which the pointer has been set, another selection key needs to be pushed, raising a problem of poor operability.

Moreover, track ball 105, which needs to have a sufficiently large size so as to enable the rotation operation, causes a difficulty in miniaturizing the mobile telephone. Another problem is that dusts, etc. tend to enter the track ball, with the result that the intruded dusts interrupts the smooth shift of the pointer.

SUMMARY OF THE INVENTION

The present invention has been devised to solve the above-mentioned problems; thus, one of its objectives is to provide a pointing device that is superior in operability, makes it possible to achieve miniaturization and is resistive to dusts, and another objective is to provide a mobile telephone in which such a pointing device is incorporated.

In one aspect of the present invention, the pointing device is provided with an information display section, a sensor section and a control section. The information display section displays information and a pointer used for selecting the information. The sensor section reads an optical image of a finger and detects movements of the finger. Based upon the movement of the finger detected by the sensor section, the control section shifts the pointer.

With this arrangement, it is possible to shift the pointer displayed on the information display section and to select necessary information by using only one finger; thus, it becomes possible to improve the operability greatly. Moreover, different from the conventional mobile telephone, the track ball requiring a sufficiently large size is no longer required; therefore, it is possible to easily miniaturize the pointing device.

Such a sensor section is preferably provided with an opening section that is formed at a portion that the finger contacts, a light-source section for directing a predetermined light beam to the fingertip through the opening section, a lens section for converging light reflected from the fingertip and a light receiving section for receiving light converged by the lens section.

In this case, it is possible to easily read the optical image of the finger by only allowing the finger to contact the opening section.

Moreover, it is preferable to provide a switch section for selecting information indicated by the pointer, with the sensor section being installed in the switching section.

In this case, after the pointer has been set to a desired piece of information by the finger contacting the sensor section, the finger is further used to push the switching section so that the information is easily selected; thus, it becomes possible to further improve the operability.

Moreover, the sensor section is preferably further provided with a contact sensor section so as to apply power only while the finger is kept in contact therewith.

In this case, it is possible to reduce power consumption.

Moreover, the control section is preferably designed to carry out a power saving process for cutting power off in the case when the operation has not been carried out for a predetermined time.

In this case, it becomes possible to reduce power consumption in the pointing device, and consequently to provide a longer service time.

Moreover, the information display section is preferably provided with a keyboard display so as to carry out an information inputting operation.

In this case, a mechanical keyboard is no longer required, thereby making it possible to eliminate troubles inherent to the mechanical keyboard, and consequently to eliminate the necessity of its maintenance.

Moreover, it is preferable to provide a cover section, fitted to the opening section, for allowing predetermined light to pass through it.

In this case, since the fingertip contacts the surface of the cover section, the distance between the light source and the finger, as well as the distance between the light-receiving section and the finger, is properly maintained so that it is possible to read the optical image of the finger with higher precision. Further, it is possible to prevent dusts from entering through the opening section.

Moreover, the cover section and the lens are preferably formed into an integral part. This further simplifies the optical system of the sensor section.

In another aspect of the present invention, the mobile telephone is provided with an information display section, a sensor section and a control section. The image display section displays at least characters or number keys and a pointer for selecting the characters or the number keys. The sensor section reads an optical image of the finger and detects the movements of the finger. Based upon the movements of the finger detected by the sensor section, the control section shifts the pointer.

With this arrangement, it is possible to shift the pointer displayed on the information display section and to select necessary characters, number keys, etc. by using only one finger; thus, it becomes possible to improve the operability greatly. Moreover, since the track ball requiring a sufficiently large size is no longer required, it is possible to easily miniaturize the mobile telephone.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
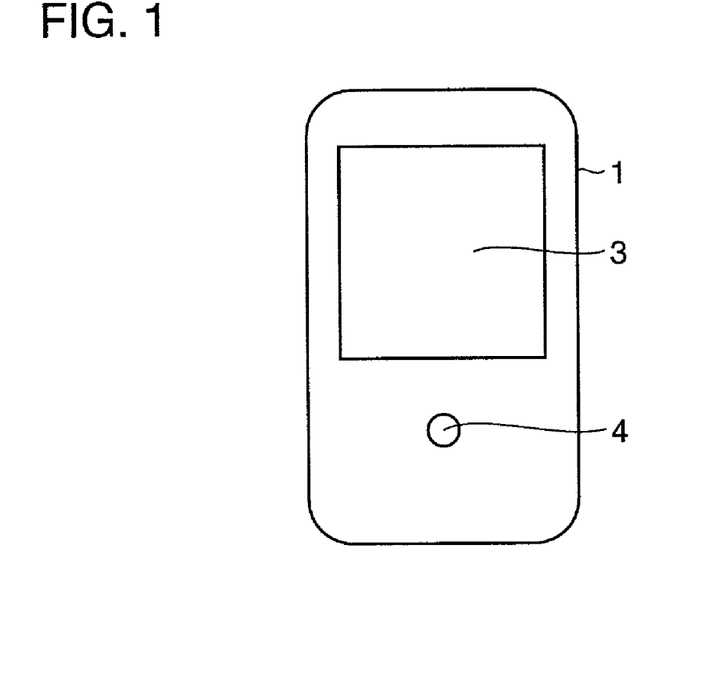
FIG. 1 is a plan view that shows a small-size mobile telephone in accordance with first embodiment of the present invention.

An explanation will be given of a small-size mobile telephone serving as a pointing device in accordance with First Embodiment of the present invention. Here, an explanation will be given of a small-size mobile telephone using an optical sensor for detecting the amount of shift of a fingertip. Referring to FIG. 1, an LCD (Liquid Crystal Display) 3 for displaying various pieces of information is placed on the front face of a small-size mobile telephone 1. An optical sensor 4 for reading an optical image of the fingertip is installed below LCD 3.

Figure 2:
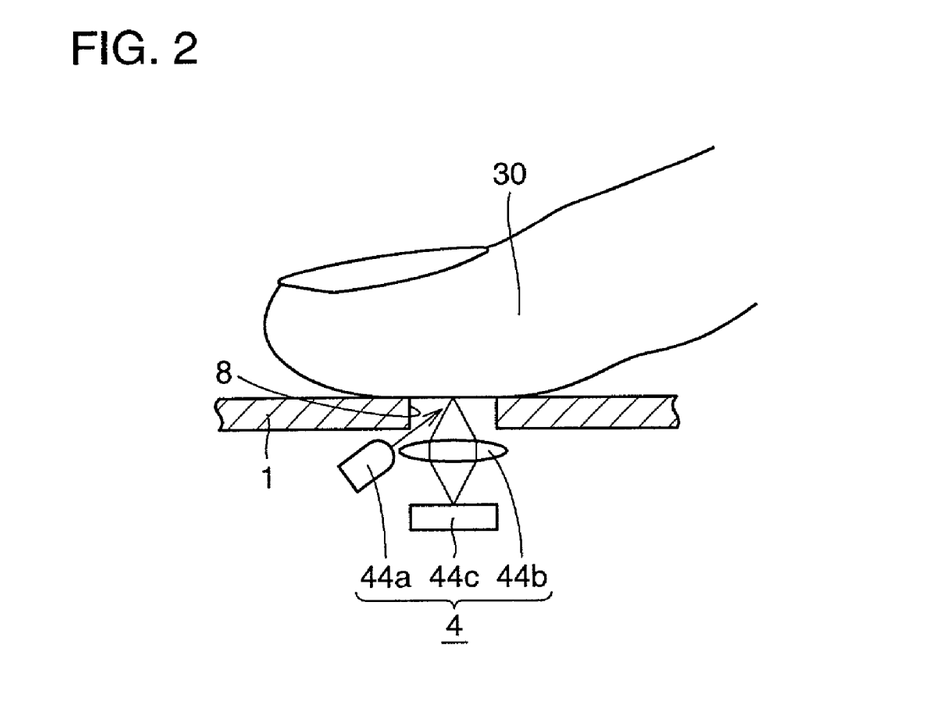
FIG. 2 is a partial cross-sectional view of an optical sensor portion that explains the operation of the small-size mobile telephone in the above-mentioned embodiment.

Referring to FIG. 2, optical sensor 4 is provided with a light source 44a for emitting a predetermined light beam toward a sensor window 8 formed in a panel of a mobile terminal 1, lens 44b for converging light reflected by a finger 30 contacting sensor window 8, and an image sensor 44c for detecting the converged light.

Figure 3:
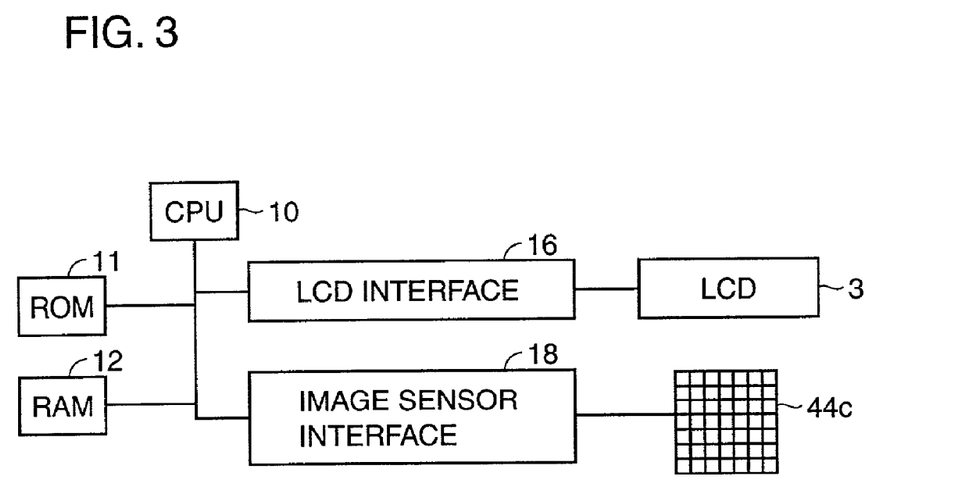
FIG. 3 is a block diagram that shows a circuit construction of the small-size mobile telephone in the above-mentioned embodiment.

Next, an explanation will be given of a circuit construction of the small-size mobile terminal. Referring to FIG. 3, information, specified and inputted by a pointer on LCD 3, is inputted to a CPU (Central Processing Unit) 10. Based upon the inputted information, a CPU 10 controls an LCD interface 16 so that various pieces of information are displayed on LCD 3.

Moreover, based upon a program stored in a ROM (Read Only Memory) 11, CPU 10 allows a RAM (Random Access Memory) 12 to store predetermined information.

Next, an explanation will be given of the operation method of the pointing device. First, finger 30 is shifted while it is in contact with sensor window 8 so as to set the pointer to a desired menu among menus displayed on LCD 3. An optical image of the finger, detected by image sensor 44c, is transmitted to CPU 10 through an image sensor interface 18 so that, for example, the shifting direction and the shift distance of finger 30 are found.

Based upon the shifting direction and the shift distance of the finger thus found, CPU 10 shifts the pointer displayed on LCD 3 through LCD interface 16. A proper input key (not shown) is pressed with the pointer indicating the necessary information to select the corresponding information. Thus, the information is displayed on LCD 3.

In particular, in this pointing device, based upon the optical image of the finger read by image sensor 44c of optical sensor 4, the shifting direction and the shift distance of finger 30 are found. There are fine irregularities on the skin surface of finger 30 and the color thereof also varies slightly. When finger 30 is shifted, the state of irregularities of the skin and the state of the color thereof that appear on sensor window 8 vary accordingly; therefore, the image of light detected after having been reflected by finger 30 also varies. Thus, the shifting direction and the shift distance of finger 30 are found by processing the image continuously detected by image sensor 44c in CPU 10.

With respect to optical sensor 4 of this type, the optical sensor attached to a mouse, for example, disclosed in "Solid-State Optical Mouse Sensor with PS/2 and Quadrature Outputs", Application Note 1179, by Agilent Technologies Inc. or Product Brief of "Agilent HDNS-2000 Optical Mouse Sensor", may be adopted.

In the above-mentioned pointing device, different from conventional mobile terminals, it is possible to set the pointer of LCD 3 to a desired menu by moving the finger while it is kept in contact with sensor window 8 without using the track ball.

With this arrangement, since the pointer is shifted by using only one finger, the operability can be improved. Moreover, in comparison with the track ball that needs to be sufficiently large, it is possible to make the optical system of the optical sensor comparatively smaller, and consequently to easily miniaturize the pointing device.

Moreover, in comparison with the track ball, it is possible to reduce intrusion of dusts, and also to reduce parts requiring mechanical operations; thus, it becomes possible to provide easiness in handling with less maintenance, etc.

Second Embodiment

Figure 4:
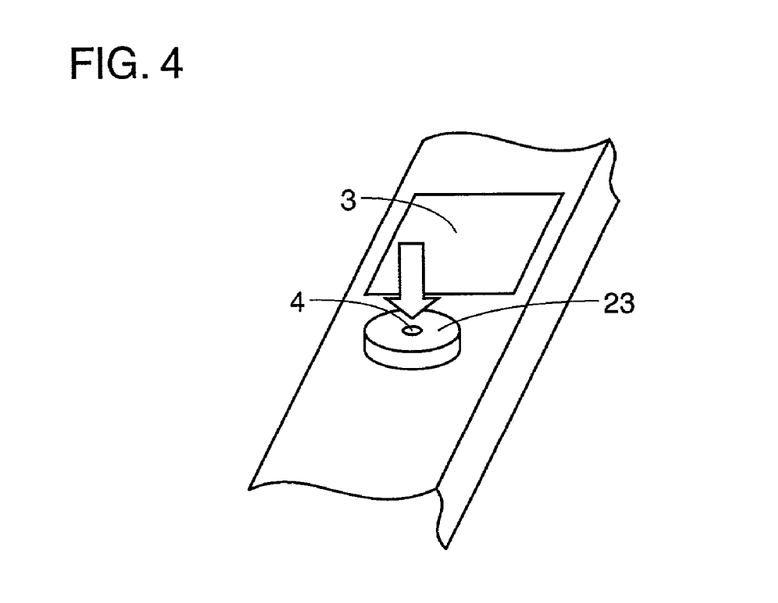
FIG. 4 is a partial perspective view that shows a small-size mobile telephone in accordance with second embodiment of the present invention.
Figure 5:
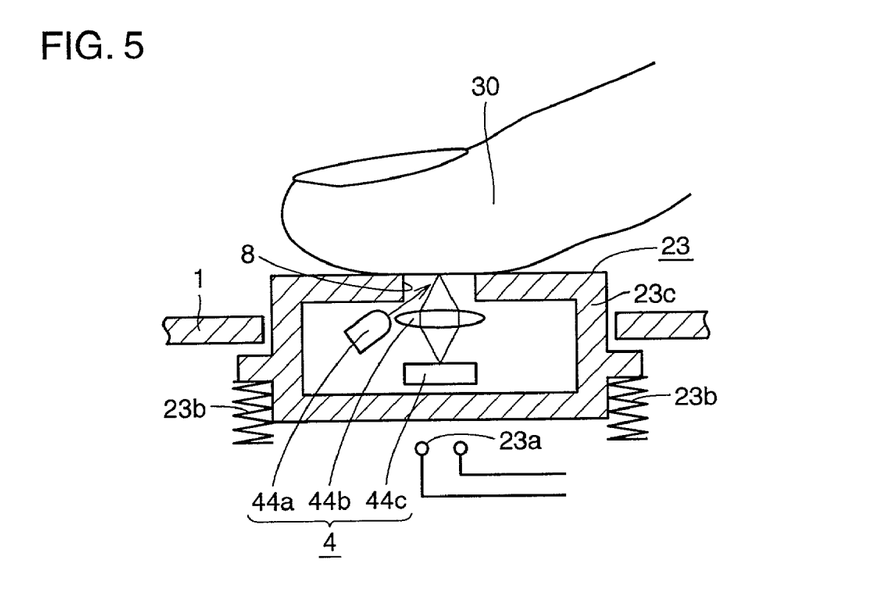
FIG. 5 is a partial cross-sectional view of an optical sensor portion that explains the operation of the small-size mobile telephone in the above-mentioned embodiment.

An explanation will be given of a small-size mobile terminal in accordance Second Embodiment of the present invention. Referring to FIGS. 4 and 5, in this small-size mobile terminal, an optical sensor 4 is installed inside push button switch 23. A sensor window 8 is placed in the vicinity of the center of push button switch 23. Light source 44*a*, lens 44*b* and image sensor 44*c*, which constitute optical sensor 4 for detecting the amount of shift of the fingertip, are respectively placed in a push button main body 23*c* of push button main switch 23.

Moreover, a spring 23*b* is attached to push button switch 23, and by pushing push button switch 23 in, by resisting the elastic force of spring 23*b*, two terminals 23*a* are electrically connected. When finger 30 is released, push button switch 23 is returned to its original position by the elastic force of spring 23*b*, thereby electrically cutting two terminals 23*a* off.

Figure 6:
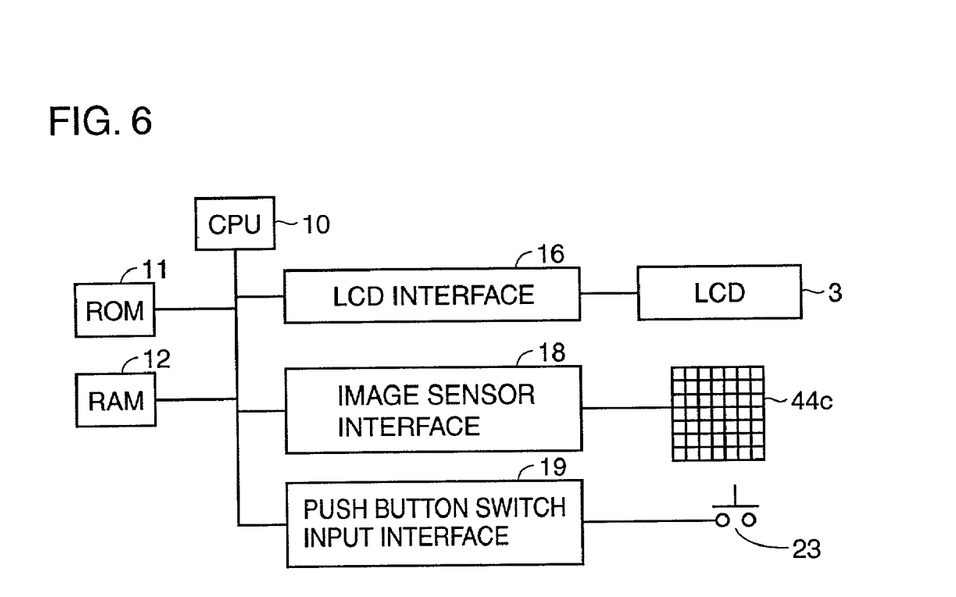
FIG. 6 is a block diagram that shows a circuit construction of the small-size mobile telephone in the above-mentioned embodiment.

Next, an explanation will be given of a circuit construction of a small-size mobile terminal. Referring to FIG. 6, in addition to the circuit construction of the aforementioned small-size mobile terminal, this small-size mobile terminal is provided with push button switch 23 and a push button switch input interface 19. A signal, which is turned ON/OFF by push button switch 23, is inputted to CPU 10 through push button switch input interface 19. The other portions of the circuit construction are the same as those of the circuit construction shown in FIG. 3, the same elements are indicated by the same reference numbers, and the description thereof is omitted.

Next, an explanation will be given of an operation method of the small-size mobile terminal. First, as described earlier, by shifting finger 30 with finger 30 being in contact with sensor window 8, the pointer is set to necessary information among pieces of information displayed on LCD 3.

At this time, based upon the optical image read by image sensor 44*c* in response to the movement of finger 30, CPU 10 finds the shifting direction and the distance of shift of finger 30. Based upon the shifting direction and the distance of shift, CPU 10 shifts the pointer displayed on LCD 3 through LCD interface 16.

With the pointer indicating necessary information, push button switch 23 is pushed in with the finger, the corresponding information is selected, and the contents thereof are displayed on LCD 3.

In addition to the effects obtained by the small-size mobile terminal explained in First Embodiment, the above-mentioned small-size mobile terminal makes it possible to provide the following effects. That is, after the pointer has been set to desired information, push button 23 housing optical sensor 4 is pushed with the same finger so as to select the information; therefore, it is possible to access the corresponding information by using only one finger, and consequently to improve the operability of the small-size mobile terminal greatly.

Third Embodiment

Figure 7:
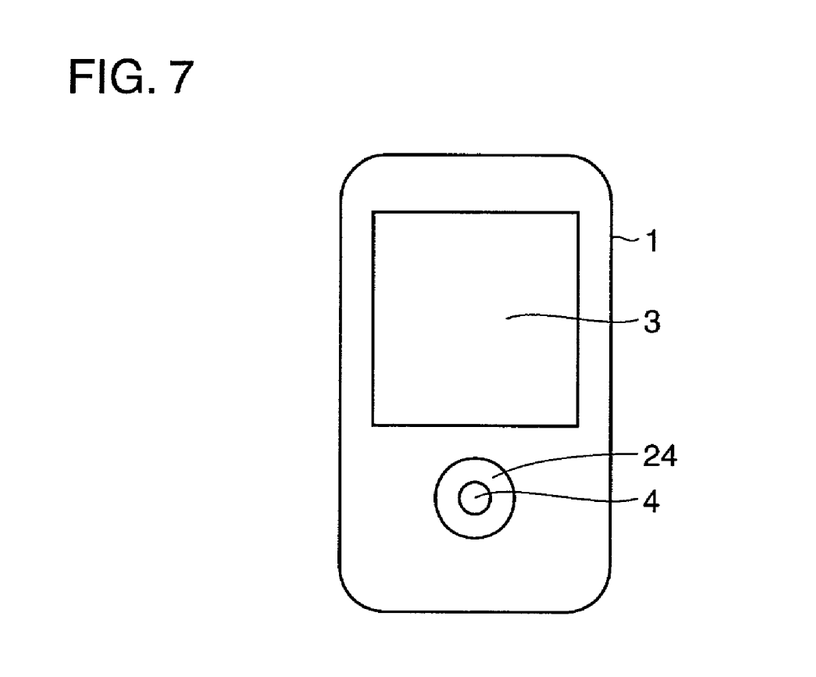
FIG. 7 is a front view that shows a small-size mobile telephone in accordance with third embodiment of the present invention.
Figure 8:
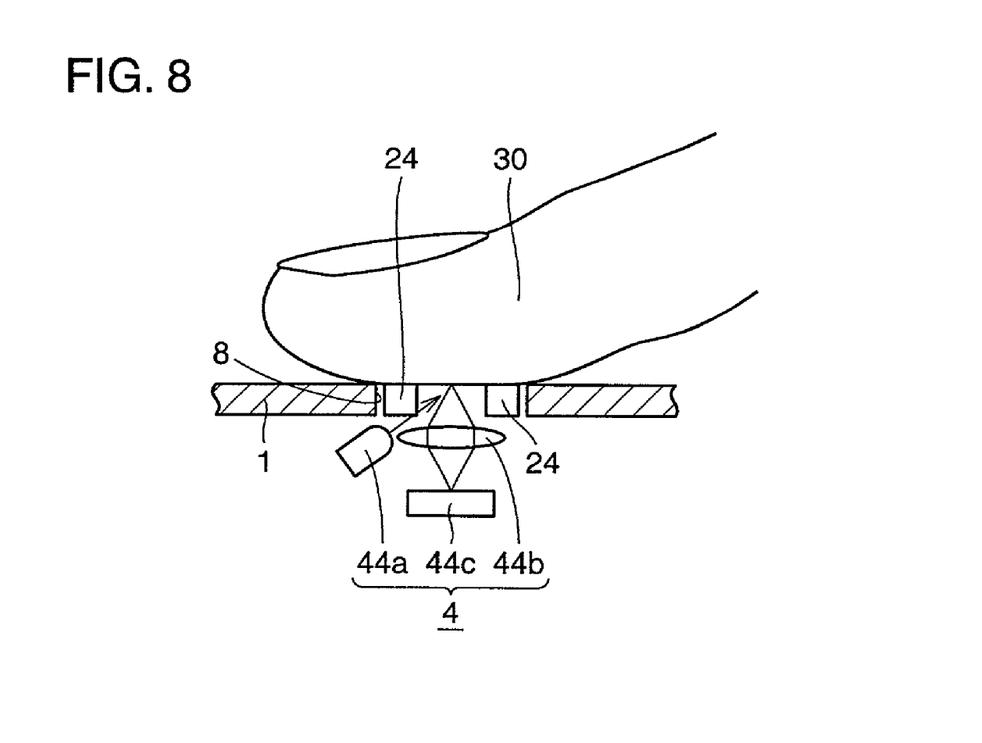
FIG. 8 is a partial cross-sectional view of an optical sensor portion that explains the operation of the small-size mobile telephone in the above-mentioned embodiment.

An explanation will be given of a small-size mobile terminal in accordance with Third Embodiment of the present invention. Referring to FIGS. 7 and 8, in this small-size mobile terminal, a predetermined contact sensor 24 is attached to sensor window 8 so that power is applied to power supply 44*a* and image sensor 44*c* of optical sensor 4 only while finger 30 is kept in contact with contact sensor 24.

Figure 9:
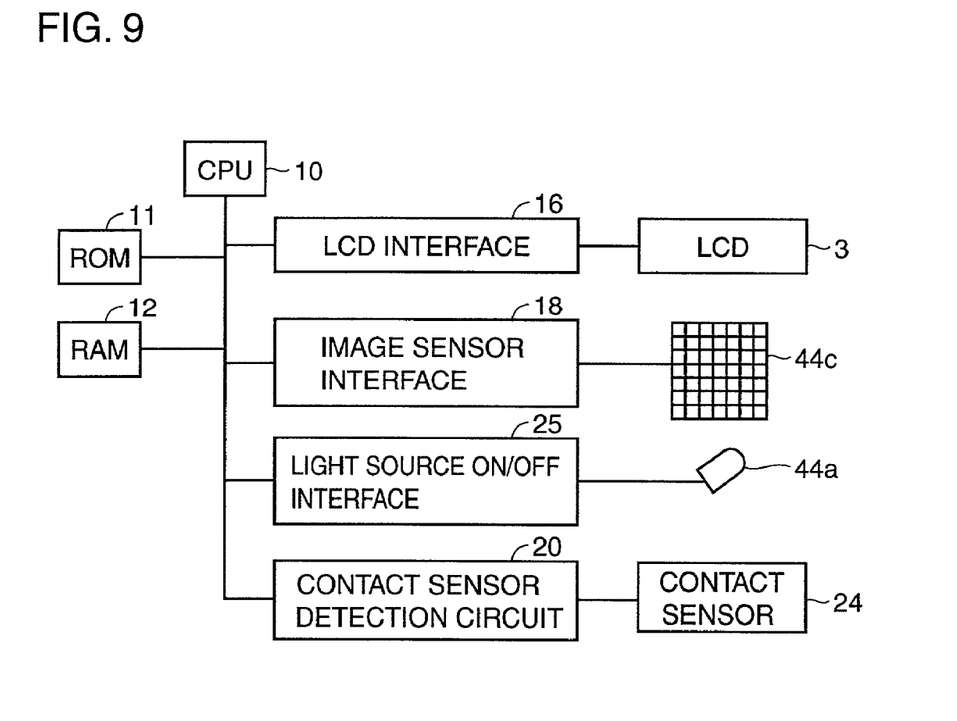
FIG. 9 is a block diagram that shows a circuit construction of the small-size mobile telephone in the above-mentioned embodiment.

Next, an explanation will be given of a circuit construction of the small-size mobile terminal. Referring to FIG. 9, in addition to the circuit construction of the aforementioned small-size mobile terminal (see FIG. 3), this small-size mobile terminal is provided with contact sensor 24, a contact sensor detection circuit 20 and a light-source ON/OFF interface 25 for controlling the power supply to light source 44*a*.

Information indicating whether or not the fingertip is in contact with sensor window 8, detected by contact sensor 24, is inputted to CPU 10 through contact sensor detection circuit 20. In the case when the fingertip is in contact with sensor window 8, power is applied to light source 44*a* through light-source ON/OFF interface 25 by CPU 10. Moreover, power is also applied to image sensor 44*c* through image sensor interface 18.

In contrast, in the case when the fingertip is not in contact with sensor window 8, the information is transmitted to CPU 10, with the result that no power is applied to light source 44*a* and image sensor 44*c*. Here, the other circuit constructions are the same as those shown in FIG. 3, the same elements are indicated by the same reference numbers and the description thereof is omitted.

Next, an explanation will be given of the operation method of the small-size mobile terminal. First, the fingertip is made in contact with contact sensor 24 attached to sensor window 8 so that electric power is applied to light source 44*a* and image sensor 44*c* of optical sensor 4. Then, as described earlier, by moving finger 30 while being in contact therewith, the pointer is set to desired information among pieces of information displayed on LCD 3.

At this time, based upon the optical image of the finger read by image sensor 44*c*, the moving direction and the shift distance of finger 30 is found by CPU 10. Based upon the moving direction and the shift distance, CPU 10 shifts the pointer displayed on LCD 3 through LCD interface 16.

In addition to the effects obtained by the small-size mobile terminal explained in the First Embodiment, the above-mentioned small-size mobile terminal makes it possible to provide the following effects. That is, power is applied to light-source 44*a* and image sensor 44*c* of optical sensor 4 for reading an optical image of the finger only while the finger is kept in contact with contact sensor 24. Thus, while the operation of the small-size mobile terminal is not carried out, no power is applied to light-source 44*a* and image sensor 44*c*, thereby making it possible to reduce the power consumption.

Fourth Embodiment

An explanation will be given of a small-size mobile terminal in accordance with Fourth Embodiment of the present invention. In this small-size mobile terminal, power application is started to, for example, a backlight illuminating the LCD from behind, light source 44a and image sensor 44c by desired operation of keys provided with the mobile terminal, and in the case when no operation has been carried out for a predetermined time, a power saving process for cutting power off is executed.

Figure 10:
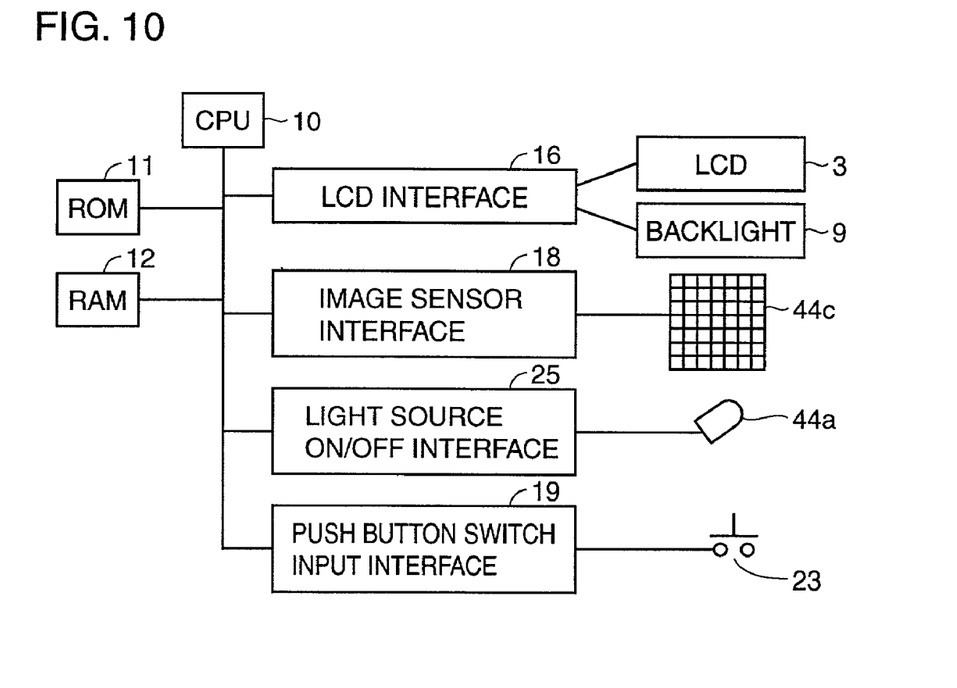
FIG. 10 is a block diagram that shows a circuit construction of a small-size mobile telephone in accordance with fourth embodiment of the present invention.

Next, an explanation will be given of the circuit construction of the small-size mobile terminal. Referring to FIG. 10, in addition to the circuit construction (see FIG. 3) of the aforementioned small-size mobile terminal, this small-size mobile terminal is provided with push button switch 23, push button switch input interface 19 and light-source ON/OFF interface 25 for controlling power supply to light-source 44a. Here, the other circuit constructions are the same as those shown in FIG. 3, the same elements are indicated by the same reference numbers and the description thereof is omitted.

A signal inputted through desired one of push button switches 23 is inputted to CPU 10 through push button switch input interface 19. When CPU 10 recognizes that desired one of push button switch 23 has been pushed, CPU 10 starts to apply power to light source 44a through light-source ON/OFF interface 25. Moreover, power is also applied to image sensor 44c through image sensor interface 18. Furthermore, power is applied to a backlight 9 through LCD interface 16.

Here, in the case when any operation has not been carried out on the small-size mobile terminal for a fixed time, power is cut off from light source 44a, image sensor 44c and backlight 9.

Figure 11:
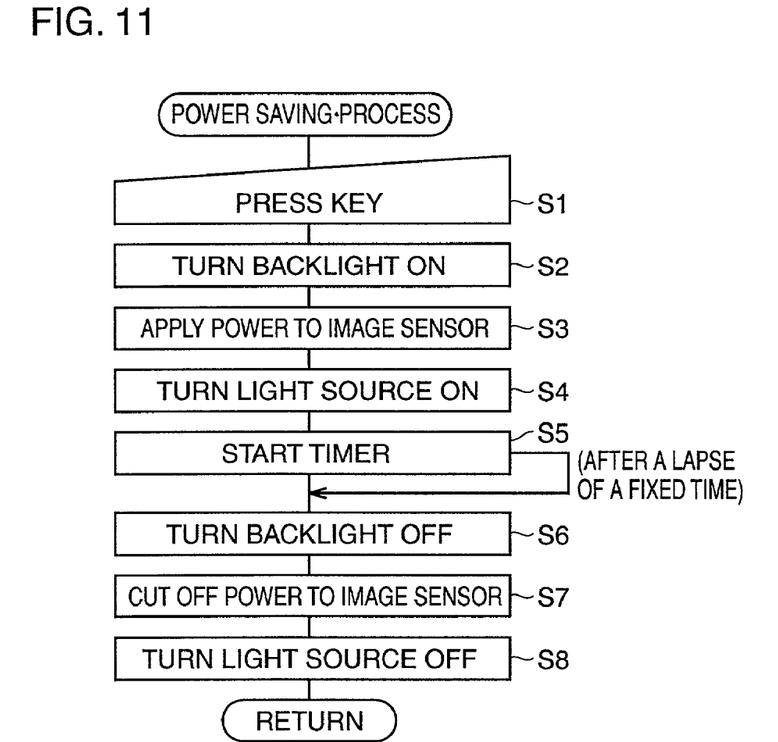
FIG. 11 is a process flow chart for carrying out a power saving process in the above-mentioned embodiment.

Next, an explanation will be given of one example of a flow chart of such a power saving process. As shown in FIG. 11, at step S1, when desired one of push button is pushed, power is applied to backlight 9, image sensor 44c and light source 44a respectively at step S2, S3 and S4. Then, a timer is activated at step S5. Thereafter, each time any operation of the small-size mobile terminal is carried out, a timer is initialized.

However, when the fixed time has elapsed without any operation of the small-size mobile terminal, power is cut off from backlight 9, image sensor 44c and light source 44a at step S6, S7 and S8.

Thereafter, each time desired one of the push button switches is pushed, power is applied, and the above-mentioned flow is executed again. In this manner, power is applied to backlight 9, image sensor 44c and light source 44a only when the operation of the small-size mobile terminal is actually carried out, and while no operation is carried out, power is cut off from these. As a result, it becomes possible to reduce power consumption of the small-size mobile terminal, and also to provide a longer service time.

Fifth Embodiment

Figure 12:
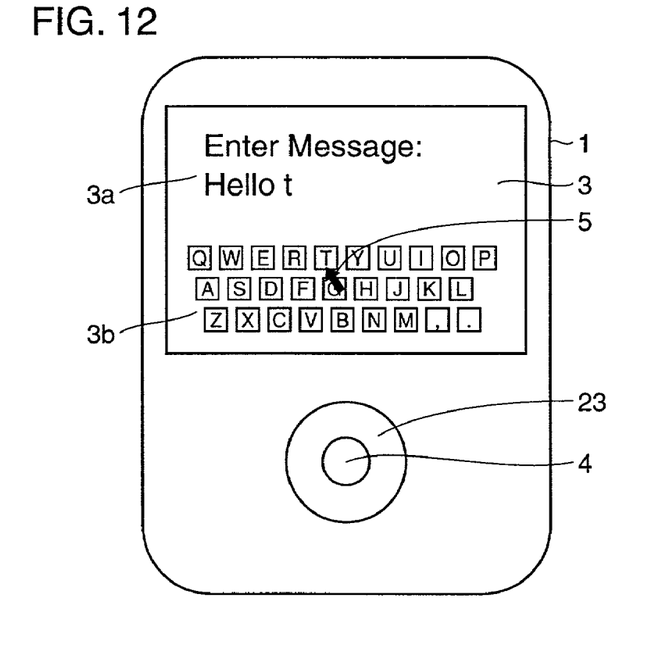
FIG. 12 is a front view that shows a small-size mobile telephone in accordance with fifth embodiment of the present invention.

An explanation will be given of a small-size mobile terminal in accordance with Fifth Embodiment of the present invention. Referring to FIG. 12, in this small-size mobile terminal 1, a keyboard (soft keyboard) 3b and a pointer 5, used for inputting characters, etc., are displayed on LCD 3. Therefore, no specific mechanical keyboard is attached to the mobile terminal.

Moreover, below LCD 3, the above-mentioned push button switches 23 and optical sensor 4 are installed. Optical sensor 4 is installed in push button switch 23 (see FIG. 5).

Figure 13:
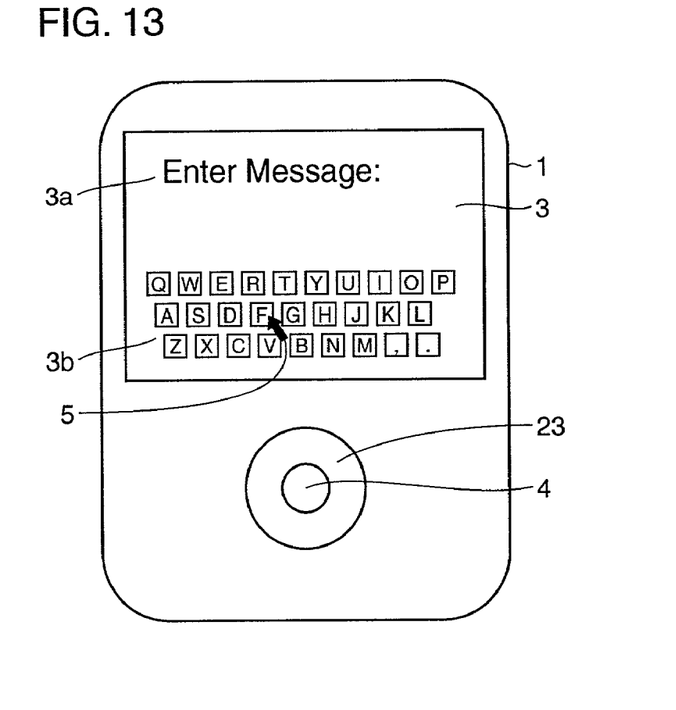
FIG. 13 is a first drawing that shows an LCD screen so as to explain the operation method of the small-size mobile telephone in the above-mentioned embodiment.

Next, an explanation will be given of a method by which characters are inputted upon sending a message, as one example of the operation of this small-size mobile terminal. First, in LCD 3 of small-size mobile terminal 1, it is assumed that before inputting characters, the initial screen is in a state as shown in FIG. 13. In other words, soft keyboard 3b and pointer 5 are displayed on LCD 3, and a menu, "Enter Message", is displayed above an input character display field 3a.

Figure 14:
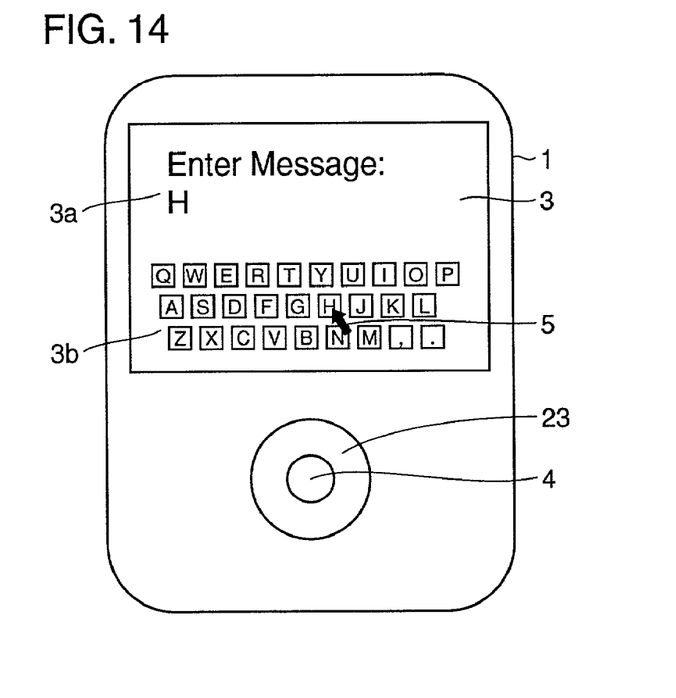
FIG. 14 is a second drawing that shows the LCD so as to explain the operation method of the small-size mobile telephone in the above-mentioned embodiment.

Next, supposing that a character to be inputted is "Hello", a letter "H" is first inputted. At this time, referring to FIG. 14, a fingertip is moved while it is kept in contact with optical sensor 4 so that pointer 5 is shifted so as to indicate "H" of soft keyboard 3b. With pointer 5 indicating "H", push button switch 23 is pressed with the fingertip to select "H". Thus, the character "H" is displayed on input character display field 3a.

Figure 15:
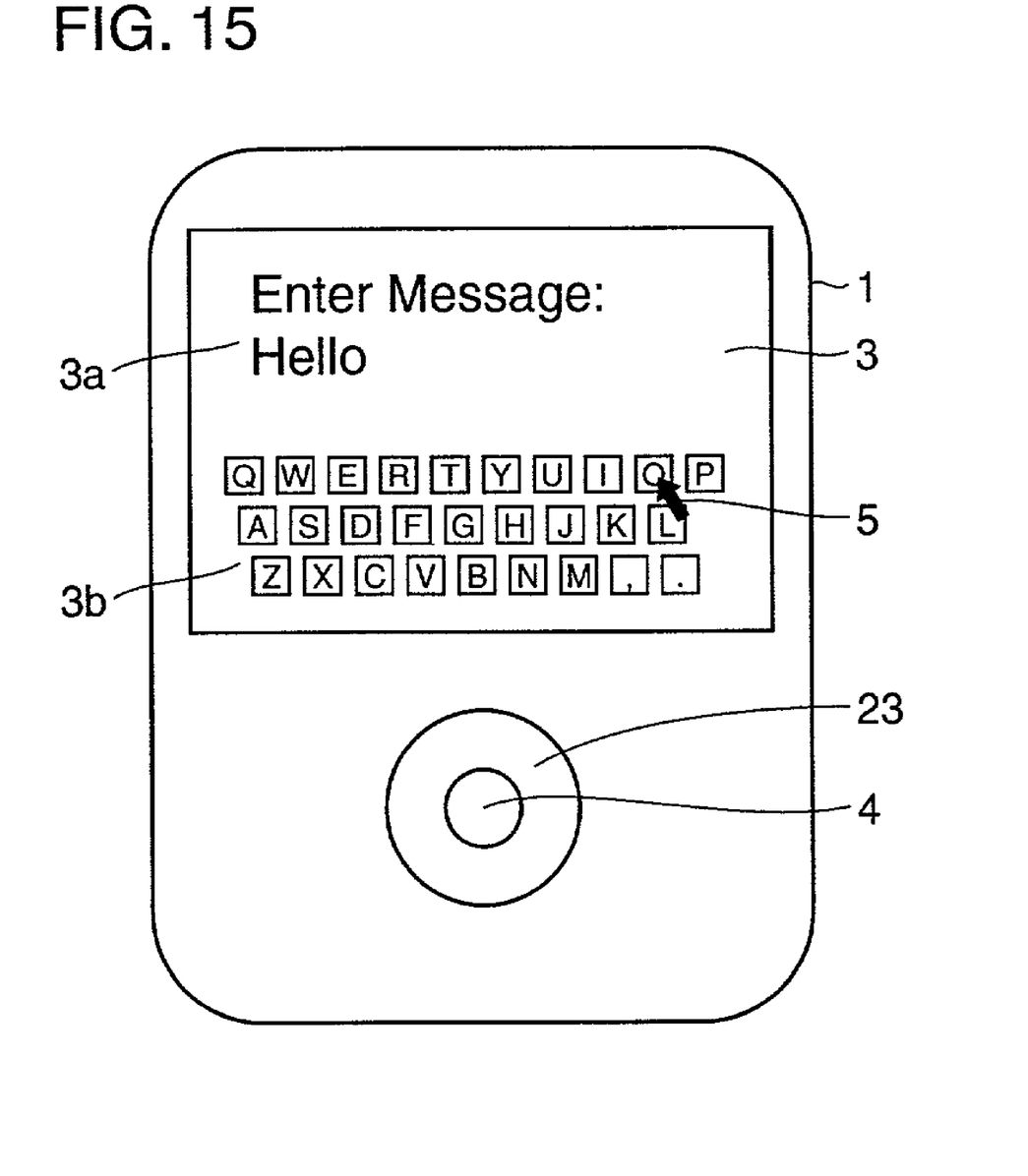
FIG. 15 is a third drawing that shows the LCD so as to explain the operation method of the small-size mobile telephone in the above-mentioned embodiment.

In the same manner as described above, desired characters on soft keyboard 3b are successively selected so that, referring to FIG. 15, the character "Hello" is displayed on input character display field 3a. The character "Hello" thus inputted is transmitted, for example, as a mail.

In the above-mentioned small-size mobile terminal, desired characters, etc. can be inputted by adjusting pointer 5 to soft keyboard 3b displayed on LCD. At this time, the pointer is adjusted by moving the fingertip while it is kept in contact with optical sensor 4, and the letter, etc. indicated by the pointer is selected by pressing the push button switch with the fingertip; thus, it is possible to easily carry out input operations by using only one fingertip.

Moreover, this small-size mobile terminal makes it possible to eliminate the necessity of any mechanical keyboard; therefore, it becomes possible to reduce mechanical malfunctions such as insufficient contact in the keyboard, and consequently to reduce the necessity of maintenance.

Sixth Embodiment

Figure 16:
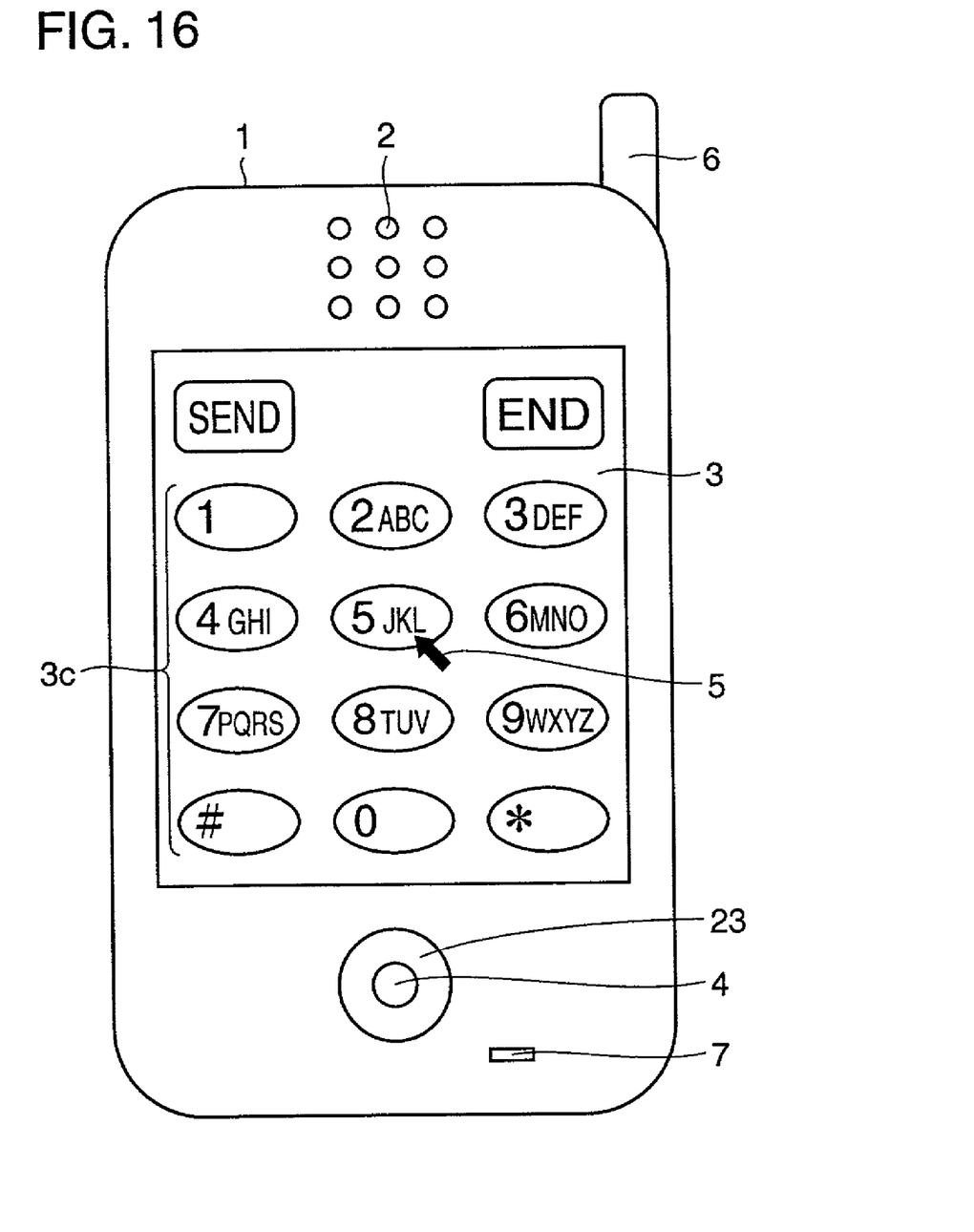
FIG. 16 is a front view that shows a small-size mobile telephone in accordance with sixth embodiment of the present invention.

An explanation will be given of a mobile telephone in which the above-mentioned optical sensor is incorporated, as a small-size mobile terminal in accordance with Sixth Embodiment of the present invention. Referring to FIG. 16, this mobile telephone 1 is provided with a speaker 2 placed on its upper portion, an LCD 3 in the vicinity of the center thereof, a microphone 7 on its lower portion and an antenna 6 on its upper end.

A keyboard (soft keyboard) 3c and pointer 5, used for inputting figures or characters, etc., are displayed on LCD 3. Therefore, no specific mechanical keyboard is attached to the mobile telephone.

Moreover, below LCD 3, a push button 23 and an optical sensor 4 are placed. Optical sensor 4 is installed in push button 23 (see FIG. 5).

Figure 17:
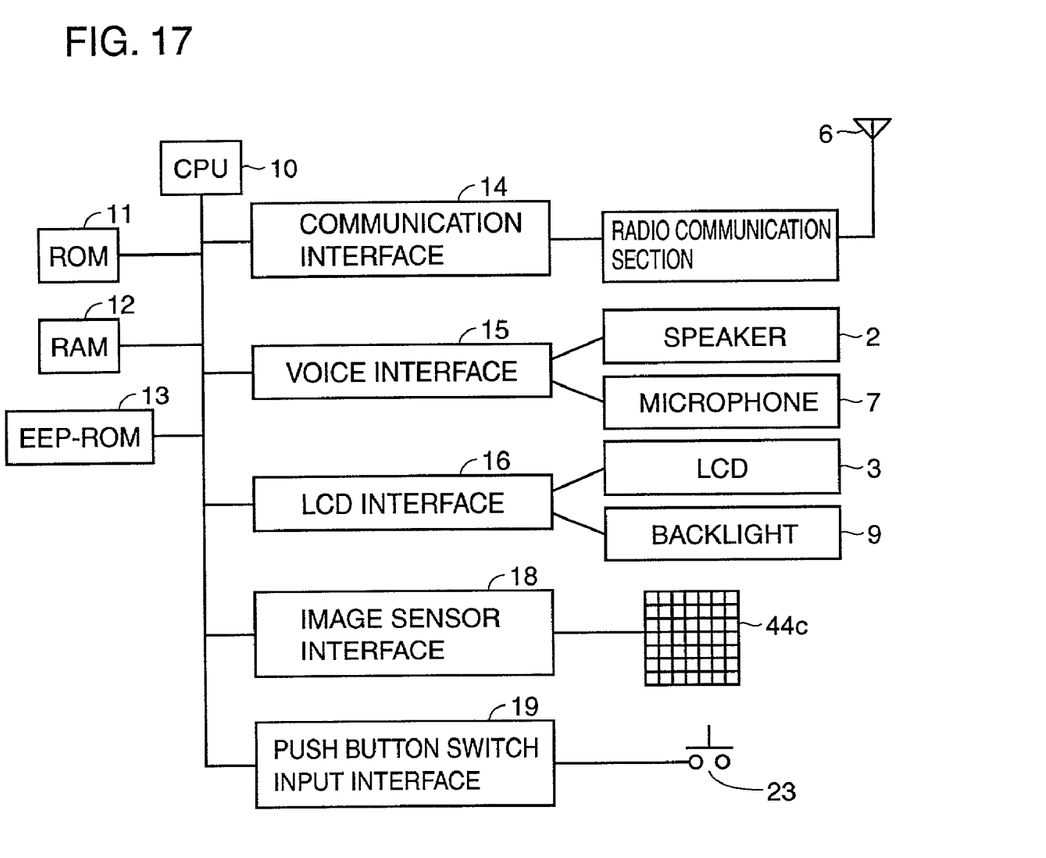
FIG. 17 is a block diagram that shows a circuit construction of the small-size mobile telephone in the above-mentioned embodiment.

Next, an explanation will be given of the circuit construction of the mobile telephone. Referring to FIG. 17, in addition to the above-mentioned circuit construction of the small-size mobile terminal (see FIG. 6), the mobile telephone is provided with an EEPROM (Electrically Erasable and Programmable Read Only Memory) 13, a voice interface 15, speaker 2, microphone 7, a communication interface 14 and a radio communication section. Moreover, backlight 9, which illuminates LCD 3 from behind, is installed in the mobile telephone.

CPU 10 allows RAM 12 to store predetermined information based upon a program stored in ROM 11, and also allows EEPROM 13 to store predetermined information such as telephone number lists and calling history.

Radio communication section 20 transmits a control signal through antenna 22 under control of CPU 10 given through communication interface 14 so as to execute predetermined calling-out process and receiving process. Moreover, radio communication section 20 subjects a voice signal inputted from microphone 7 under control of CPU 10 to a predetermined signal process through voice interface 15, and transmits the resulting signal, and also subjects a receiving signal to a predetermined signal process, and outputs the resulting signal to speaker 2. Moreover, power is applied to backlight 9 through LCD interface 16 under control of CPU 10.

Here, the other circuit constructions are virtually the same as those of FIG. 6; therefore, the same parts are indicated by the same reference numbers and the description thereof is omitted.

Here, the basic operation of this mobile telephone is the same as the operation of the aforementioned small-size mobile terminal (see FIG. 12). Therefore, in the case when a telephone call is made on LCD 3 shown in FIG. 16, pointer 5 is shifted with a fingertip being in contact with optical sensor 4 so that pointer 5 is adjusted to indicate the first figure of the telephone number of the other communication end. Next, with pointer 5 indicating the first figure, button switch 23 is pressed with the fingertip to select the figure.

In the same manner as described above, the figures of the telephone number are successively selected. Thus, after all the telephone number of the other communication end has been inputted, calling is started, thereby connecting to the telephone of the other end so as to communicate with the other end.

In above-mentioned mobile telephone, desired figures, etc. are inputted by adjusting pointer 5 to soft keyboard 3*b* displayed on LCD 3. At this time, the pointer is adjusted by moving a fingertip while it is kept in contact with optical sensor 4 and pushing the push button switch with the fingertip to press the figure, etc. indicated by the pointer so that the figure, etc. is selected; thus, the inputting operation of a telephone number is carried out easily by using only one fingertip.

Moreover, this mobile telephone makes it possible to eliminate the necessity of any mechanical keyboard; therefore, it becomes possible to reduce mechanical malfunctions such as insufficient contact in the keyboard, and consequently to reduce the necessity of maintenance.

Seventh Embodiment

An explanation will be given of a small-size mobile terminal in accordance with Seventh Embodiment. Here, the following description will particularly discuss a revised example (variation) of an optical sensor to be used in the above-mentioned small-size terminal.

Figure 18:
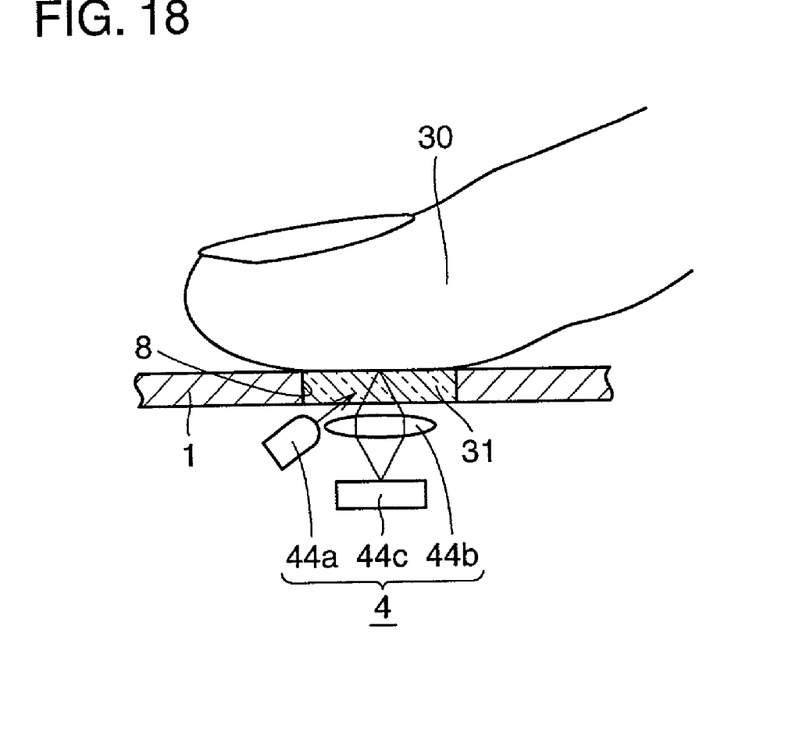
FIG. 18 is a cross-sectional view that shows a sensor portion of a small-size mobile telephone in accordance with seventh embodiment of the present invention.

For example, referring to FIG. 18, a cover glass 31 is fitted into a sensor window 8 attached to the small-size mobile terminal. A light beam, emitted from a light source 44*a* is reflected by the surface of finger 30 through cover glass 31, and the reflected light is made incident on image sensor 44*c* via lens 44*b* after again passing through cover glass 31.

In this small-size mobile terminal, in addition to the effects explained in First Embodiment, the following effects are obtained: The application of such cover glass 31 to sensor window 8 allows the surface of the fingertip to always position on the surface of cover glass 31 even when the finger is in motion; therefore, it becomes possible to eliminate variations in the distance between light source 44*a* and the finger and the distance between the finger and image sensor 44*c*.

Consequently, the light, reflected by the finger after having been directed thereto, is stably made incident on image sensor 44*c*, thereby making it possible to detect an optical image of the finger with higher precision. Moreover, since cover glass 31 is fitted into sensor window 8, it is possible to positively prevent dusts from entering sensor window 8.

Figure 19:
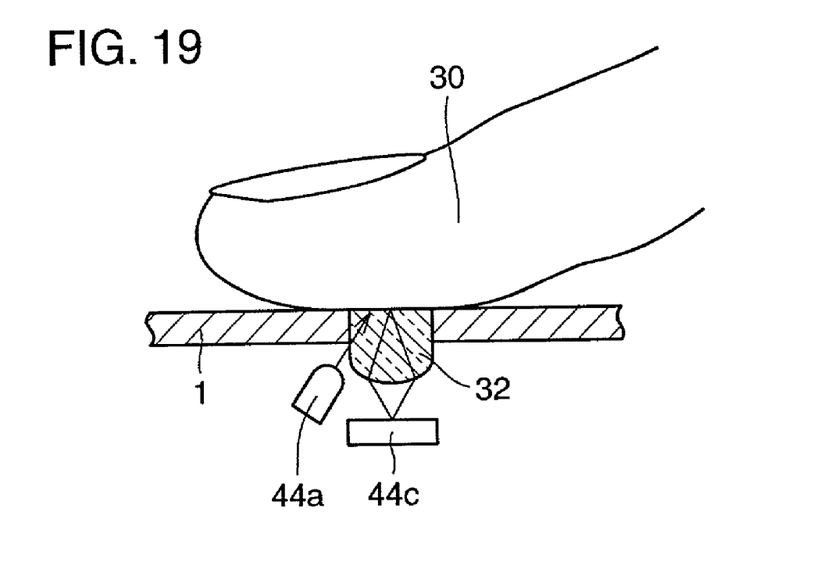
FIG. 19 is another cross-sectional view that shows the sensor portion of the small-size mobile telephone in the above-mentioned embodiment.

In another example of this, the small-size mobile terminal shown in FIG. 19 is provided with a cover-glass integrated-type lens 32 in which the above-mentioned cover glass 31 and lens 44*c* are integrally formed, and this is fitted into sensor window 8.

By attaching such cover-glass integrated-type lens 32 to sensor window 8, it becomes possible to easily assemble optical sensor 4, as compared with the case in which the cover glass and the lens are separately formed, and consequently to reduce offsets in the light axis of the optical system. Moreover, it is possible to prevent dusts from entering the sensor window 8.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A pointing device comprising:
   a housing, the housing including a housing opening section formed in a predetermined position in the housing;
   a light emitting section configured to emit a light beam toward an object;
   a switch member including an optical opening section configured to allow passage of the light beam directed to said object by said light emitting section and reflected therefrom, the switch member being disposed in the housing opening section; and
   an image sensor section configured to receive the light beam reflected from said object and detect an optical image of said object,
   wherein said switch member is movable while relative positional relation of said switch member and said optical opening section in said switch member is maintained, and
   said optical opening section in said switch member has a member configured to transmit light arranged therein, said member is arranged such that an upper surface of said member does not extend beyond a surface of the switch member with which said object comes in contact.

2. The pointing device according to claim 1, wherein said light emitting section, said switch member, and said image sensor section are arranged such that relative positional relation among them is maintained.

3. An electronic device comprising:
   a housing, the housing including a housing opening section formed in a predetermined position in the housing;
   a light emitting section configured to emit a light beam toward an object;
   a switch member including an optical opening section configured to allow passage of the light beam directed to said object by said light emitting section and reflected therefrom, the switch member being disposed in the housing opening section;

an image sensor section configured to receive the light beam reflected from said object and detect an optical image of said object;

a display section configured to display information and a pointer configured to indicate the information; and a control section configured to calculate an amount of shift of said object based on said optical image and shift said pointer in said display section based on said amount of shift, wherein said control section is configured to select information indicated by said pointer in said display section based on movement of said switch member, and said optical opening section in said switch member has a member configured to transmit light arranged therein, said member is arranged such that an upper surface of said member does not extend beyond a surface of the switch member with which said object comes in contact.

4. The electronic device according to claim 3, wherein said control section is configured to control application of predetermined power to at least one of said light emitting section and said image sensor section.

5. The electronic device according to claim 4, further comprising a contact sensor arranged in a vicinity of said optical opening section in said switch member and configured to sense contact of said object, wherein said control section is configured to apply said predetermined power while said object is in contact with said contact sensor and to stop application of said predetermined power while contact between said object and said contact sensor is absent.

6. The electronic device according to claim 4, further comprising an operation section for external input of information, wherein said control section is configured to apply said predetermined power while said operation section is operated and to stop application of said predetermined power while an operation of said operation section is absent.

7. An electronic device comprising:

a housing, the housing including a housing opening section formed in a predetermined position in the housing;

a light emitting section configured to emit a light beam toward an object;

a switch member including an optical opening section configured to allow passage of the light beam directed to said object by said light emitting section and reflected therefrom, the switch member being disposed in the housing opening section;

an image sensor section configured to receive the light beam reflected from said object and detect an optical image of said object;

a display section configured to display information and a pointer configured to indicate the information;

a control section configured to calculate an amount of shift of said object based on said optical image and shift said pointer in said display section based on said amount of shift; and a contact sensor arranged in a vicinity of said optical opening section and configured to sense contact of said object, wherein said control section is configured to apply predetermined power to at least one of said light emitting section and said image sensor section while said object is in contact with said contact sensor and to stop application of said predetermined power while contact between said object and said contact sensor is absent, and said optical opening section in said switch member has a member configured to transmit light arranged therein, said member is arranged such that an upper surface of said member does not extend beyond a surface of the switch member with which said object comes in contact.

* * * * *